United States Patent [19]
Bobb et al.

[11] Patent Number: 5,461,927
[45] Date of Patent: Oct. 31, 1995

[54] OPTICAL FIBER STRAIN SENSOR FOR MEASURING MAXIMUM STRAIN

[75] Inventors: Lloyd C. Bobb, Horsham; Howard D. Krumboltz, Chalfont, both of Pa.

[73] Assignee: The United States of America as represented by the Secretary of the Navy, Washington, D.C.

[21] Appl. No.: 272,915

[22] Filed: Jun. 30, 1994

[51] Int. Cl.$^6$ .................. H01J 5/16; G02B 6/02
[52] U.S. Cl. .............. 73/800; 73/770; 73/775; 250/227.15; 250/227.16; 356/34
[58] Field of Search ............ 73/700, 762, 770, 73/775, 800; 356/32, 34, 35; 250/227.14, 227.15, 227.16

[56] References Cited

U.S. PATENT DOCUMENTS

| | | | |
|---|---|---|---|
| 4,761,073 | 8/1988 | Meltz et al. | 356/32 |
| 4,848,871 | 7/1989 | Seidel et al. | 73/800 |
| 4,928,004 | 5/1990 | Zimmermann et al. | 250/227.14 |
| 4,947,693 | 8/1990 | Szuchy et al. | 73/800 |
| 5,044,205 | 9/1991 | Wolff et al. | 73/800 |
| 5,089,697 | 2/1992 | Prohaska | 250/227.14 |
| 5,132,529 | 7/1992 | Weiss | 250/227.16 |
| 5,182,449 | 1/1993 | Johnson et al. | 73/800 |
| 5,345,519 | 9/1994 | Lu | 250/227.14 |

FOREIGN PATENT DOCUMENTS

| 1747879 | 7/1992 | U.S.S.R. | 250/227.14 |
|---|---|---|---|

Primary Examiner—Richard Chilcot
Assistant Examiner—George M. Dombroske
Attorney, Agent, or Firm—James V. Tura; Susan E. Verona

[57] ABSTRACT

An optical fiber strain sensor is provided which remembers the maximum strain a structure has experienced in a given timeframe. A pair of multi-mode optical fibers with flat ends meet end-to-end within a microbore capillary tube with which the fibers have frictional contact. The fibers are fastened to the structure at two points a known distance apart on either side of the capillary tube. Increasing strain in the structure pulls the fiber ends apart in proportion to the amount of strain; however, when strain is decreasing, the fibers buckle rather than move closer together. Therefore, the maximum strain is reflected as a maximum distance between the fiber ends. When the maximum strain experienced is to be measured, the free end of one fiber is connected to a light source and the free end of the other fiber is connected to a detector. The intensity of light transmitted to the detector will vary inversely with the distance apart the fiber ends are; therefore, this distance can be measured and correlated with strain to a high degree of accuracy.

6 Claims, 3 Drawing Sheets

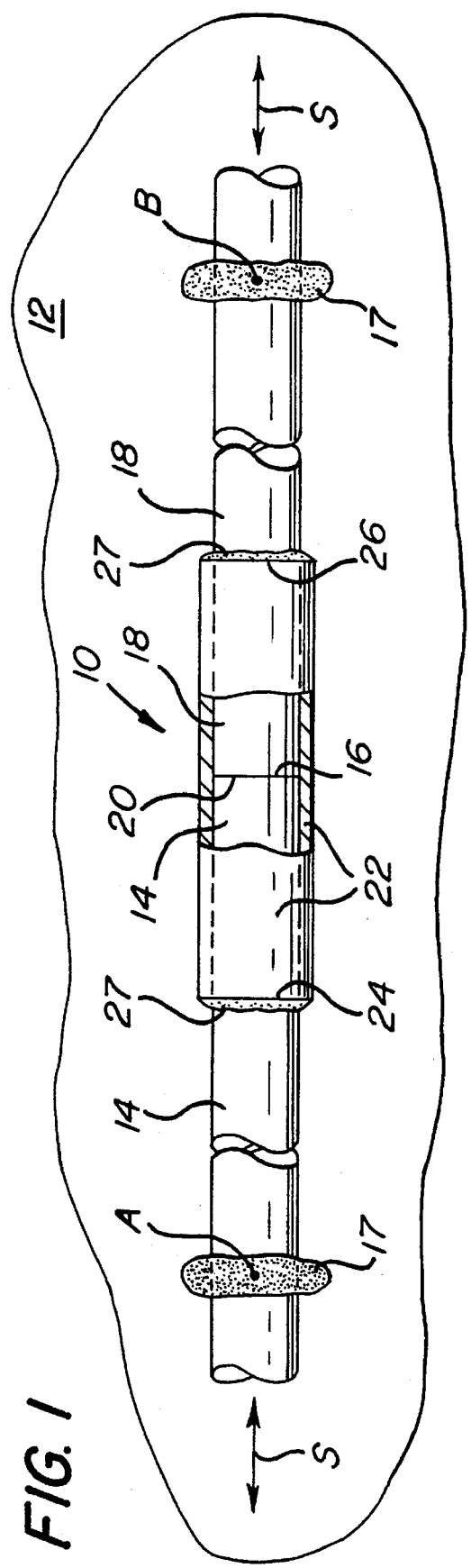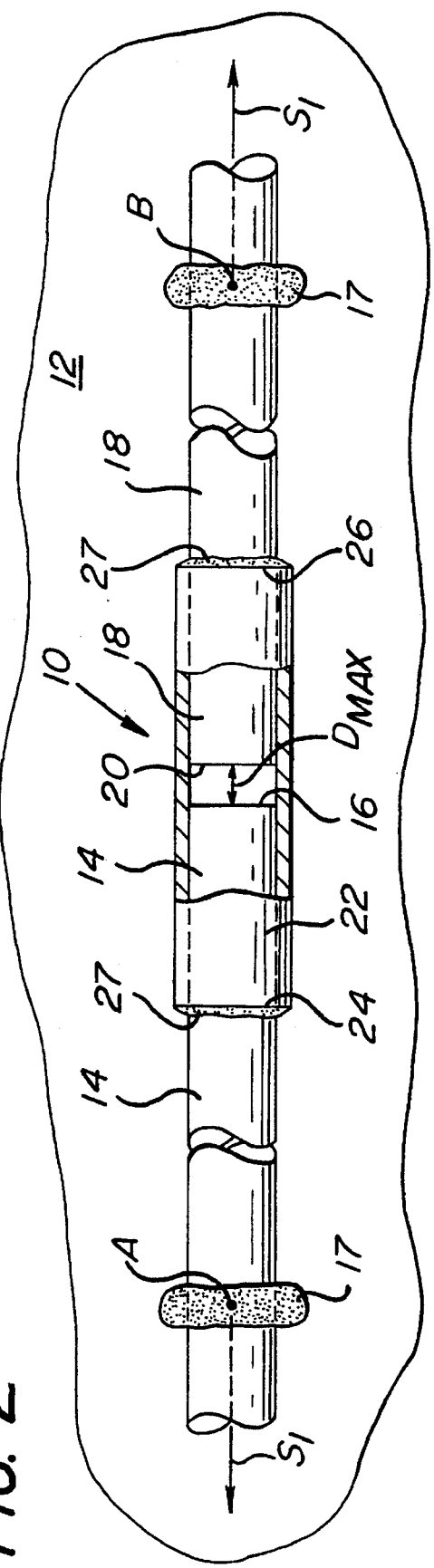

OPTICAL FIBER STRAIN SENSOR FOR MEASURING MAXIMUM STRAIN

STATEMENT OF GOVERNMENT INTEREST

The invention described herein may be manufactured and used by and for the Government of the United States of America for governmental purposes without the payment of any royalties thereon or therefor.

BACKGROUND OF THE INVENTION

The present invention relates generally to a sensor for measuring displacement, and more particularly to an optical fiber strain sensor.

It is often desirable to monitor strain in a structure, such as a bridge or highway overpass, a building, or a component in a vehicle, in order to get advance warning of fracture or other failure of the structure. However, it is not always convenient (or even necessary) to monitor the strain as it is occurring, and it is sufficient to know merely the maximum strain the structure has experienced in a given timeframe. For example, for vehicles such as aircraft, weight, space and other limitations would preclude monitoring strain of components therein in real time, but for purposes of evaluating the likelihood of future failure, it would be sufficient to know the maximum strain the component in the vehicle experienced during a particular trip. Therefore, it would be convenient to have a means of sensing and maintaining for later measurement the maximum strain the component experienced.

Optical fiber sensors for measuring strain are known in the art, and have many advantages over other types of sensors. They are economical, durable, light-weight, and can be used in electromagnetically noisy environments, and are therefore ideal for use in aircraft. Currently-used optical fiber sensors either require active and continuous recording of the strain in real time or are of the on-off type wherein the optical fiber fails at a predetermined strain level. None of them provides a maximum strain measurement without continuous monitoring.

SUMMARY OF THE INVENTION

It is therefore an object of the present invention to provide an optical fiber strain sensor which can monitor the maximum strain a structure has experienced in a given timeframe and maintain it for later measurement.

It is another object of the present invention to provide a simple, durable, inexpensive, light-weight, and highly accurate strain sensor.

These and other objects are accomplished by apparatus for sensing and retaining for later measurement the maximum displacement in a given direction which has occurred between a first location and a second location. The apparatus comprises a first optical waveguide capable of transmitting light therethrough and having a flat end, attachable on a portion of the outer surface thereof to the first location, and a second optical waveguide capable of transmitting light therethrough and having a flat end, attachable on a portion of the outer surface thereof to the second location and positioned so that the flat ends of the first and second waveguides are in contact with each other across their entire surfaces when both waveguides are taut. A tube slidably encloses the flat ends of the first and second optical waveguides therein, and retains the waveguides in position. The displacement pulls the flat ends apart and friction between the waveguides and the tube retains the maximum distance the flat ends separate. This maximum distance correlates with the maximum displacement and can be measured by launching light of a known intensity into the first optical waveguide and measuring the intensity of the light emerging from the second optical waveguide.

Other objects, advantages, and novel features of the invention will become apparent from the following detailed description of the invention when considered in conjunction with the accompanying drawings.

BRIEF DESCRIPTION OF THE DRAWINGS

FIG. 1 is a pictorial view, partially broken away, of the optical fiber strain sensor of the present invention mounted on a structure in which maximum strain is to be measured.

FIG. 2 is a pictorial view, partially broken away, of the optical fiber strain sensor of FIG. 1 after the structure has undergone strain in a given direction.

DESCRIPTION OF THE PREFERRED EMBODIMENT

Figure 3:
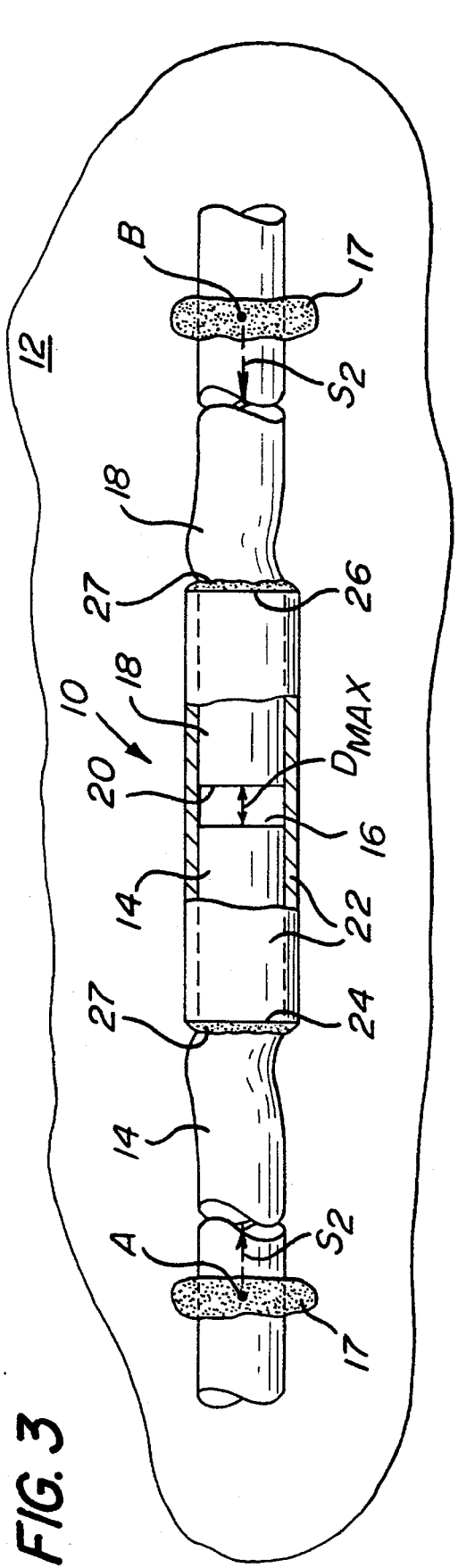
FIG. 3 is a pictorial view, partially broken away, of the optical fiber strain sensor of FIG. 2 after the structure has undergone a reduction in strain from that shown in FIG. 2.

Referring now to the drawings, wherein like characters represent like or corresponding parts throughout the several views, one sees in FIG. 1 one embodiment of the optical fiber strain sensor 10 of the present invention being used to sense the strain in a structure 12. The strain to be measured is that which occurs in the known distance between points A and B in the direction shown by arrows S. A first optical waveguide or fiber 14 having a flat end 16 is fixed, such as by an adhesive 17 like epoxy, to structure 12 at point A on the structure, and is positioned so that flat end 16 extends in the direction of point B. A second optical waveguide or fiber 18 having a flat end 20 is fixed, such as by an adhesive 17 like epoxy, to structure 12 at point B on the structure, and is positioned so that flat end 20 extends in the direction of point A until it meets flat end 16 of optical fiber 14 without any slack in fiber 18. Optical fibers 14 and 18 should preferably be multi-mode as opposed to single-mode, since multi-mode fibers have a larger core and are therefore less sensitive to transverse displacement. Their associated components are less expensive as well.

Flat ends 16 and 20 of optical fibers 14 and 18 meet and are physically flush across the entire surfaces of the flat ends, thereby allowing maximum coupling of light from one fiber into the other fiber. To encourage this, flat ends 16 and 20 should be perpendicular to the axis of their respective fibers 14 and 18, and should be as smooth as possible. Carefully cleaving or cleaving and polishing flat ends 16 and 20 should be sufficient.

Fibers 14 and 18 are initially retained in this flat end-to-flat end position by a microbore capillary tube 22 which encloses fibers 14 and 18 therein in the vicinity of their flat ends 16 and 20. Flat ends 16 and 20 should preferably meet near the middle of tube 22. Tube 22 is fixed, such as by epoxy (not shown), to structure 12. Tube 22 may be colinear with the line between points A and B, or it may be off-line by being angled with it but centered on it, or by being shifted to the side but parallel with it. Fibers 14 and 18 are positioned and sized as necessary so that flat ends 16 and 20 meet at approximately the center of tube 22 without any slack in either fiber. The inner diameter of tube 22 nearly matches the outer diameter of fibers 14 and 18, which are slidable therein. The tighter the fit is between tube 22 and fibers 14 and 18, the more perfectly aligned the fibers will be with each other, maximizing the coupling of light from one to the other. Some clearance is required to allow air to flow between fibers 14 and 18 and tube 22. Tube 22 is shorter than the distance between points A and B, leaving some of each of the fibers unenclosed near points A and B.

Each of fibers 14 and 18 is in frictional contact with tube 22 at some point along the distance over which the tube encloses the fiber, that point preferably being at a respective end 24 or 26 of tube 22, as shown in FIG. 1. This frictional contact initially retains the fibers in the end-to-end position. Frictional contact between tube 22 and fibers 14 and 18 may be established by providing a non-elastic adhesive 27 such as wax between each of the fibers and the tube at its respective end 24 or 26, effectively reducing the inner diameter of the tube at its ends to the outer diameter of the fibers. The frictional contact formed should be such that the frictional force can be overcome by the strain in structure 12 before either one of fibers 14 or 18 breaks and before either bond between the fibers and the structure breaks. The bonding force between fibers 14 and 18 and structure 12 can be increased by applying adhesive 17 over more fiber surface area at the respective points A and B. Fibers 14 and 18 are pretensioned before being adhered to either tube 22 or structure 12 to make them taut.

In operation, structure 12 will strain in direction $S_1$, shown in FIG. 2, pulling fibers 14 and 18 from points A and B. The frictional forces at ends 24 and 26 of tube 22 will be overcome and flat ends 16 and 20 will separate. FIG. 2 shows sensor 10 and structure 12 under such a first maximum strain condition. Flat ends 16 and 20 have separated by a distance $D_{max}$.

FIG. 3 shows sensor 10 and structure 12 after the strain has been reduced from that shown in FIG. 2, and so points A and B have moved in the direction $S_2$. Fibers 14 and 18 have buckled (shown pictorially to exaggerate the effect) between their respective attachment points at A and B and their respective points of entry into tube 22 at its ends 24 and 26. Fibers 14 and 18 buckle instead of sliding back into tube 22 because the frictional force between the fibers and the tube exceeds the buckling load. The buckling load is low because the slenderness ratio of fibers 14 and 18 is high. Buckling can be encouraged by positioning tube 22 out of alignment with the direction of strain S, as discussed above. The degree to which tube 22 is out of alignment can be extremely small. Since fibers 14 and 18 do not slide back into tube 22, the distance $D_{max}$ between flat ends 16 and 20 is retained or "remembered". The frictional force and the small clearance between tube 22 and fibers 14 and 18 is sufficient to hold $D_{max}$ constant. If structure 12 were to again strain in the direction $S_1$ shown in FIG. 2 to a greater extent than the previous strain $S_1$, fibers 14 and 18 would further pull out of tube 22, separating the distance between flat ends 16 and 20. A new $D_{max}$ would thus be created. In this way, sensor 10 retains the maximum strain position for later measuring.

Figure 4:
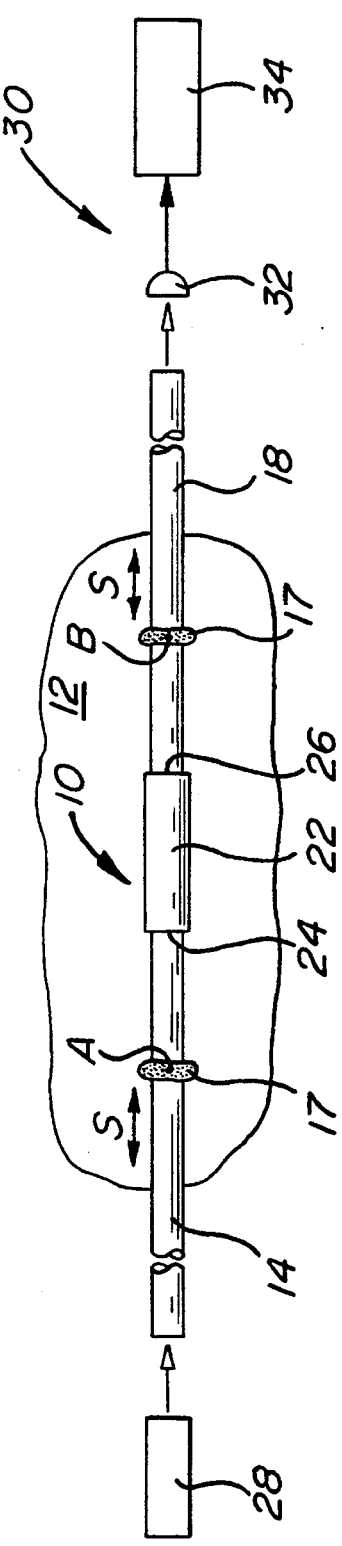
FIG. 4 is a schematic illustration of the optical fiber strain sensor of FIG. 1 showing apparatus for later measurement of the maximum strain.

The maximum strain experienced by structure 12 can be measured by measuring the distance $D_{max}$ between flat ends 16 and 20. Of course, trigonometry or calibration can be used to correlate the distance $D_{max}$ between flat ends 16 and 20 with the strain in structure 12 when tube 22 is not aligned with points A and B. The distance $D_{max}$ between the flat ends can be measured by measuring light transmission across the distance, as shown schematically in FIG. 4. Light of a known intensity from a light source 28 such as an IR laser diode or LED is launched into fiber 14 so that it propagates therethrough in the direction of fiber 18. The light then couples into fiber 18, propagates therethrough and is detected and measured by a detector 30 such as a silicon photodiode 32 connected to a conventional detection circuit 34. As the distance between fibers 14 and 18 increases, proportionately less light is coupled from one fiber to the other. The intensity of transmitted light is very sensitive to the distance apart of flat ends 16 and 20, so strain can be measured to a high degree of accuracy. For example, a difference in strain of 1000 microstrain between two points 2.54 cm apart can be measured as approximately a 20% difference in light output intensity using multi-mode optical fibers having a 68-micron core diameter and an overall diameter of 75 microns and a one-cm long microbore quartz tube with a 90-micron inside diameter. Of course, sensor 10 must be calibrated in order to correlate strain with light intensity.

Figure 5:
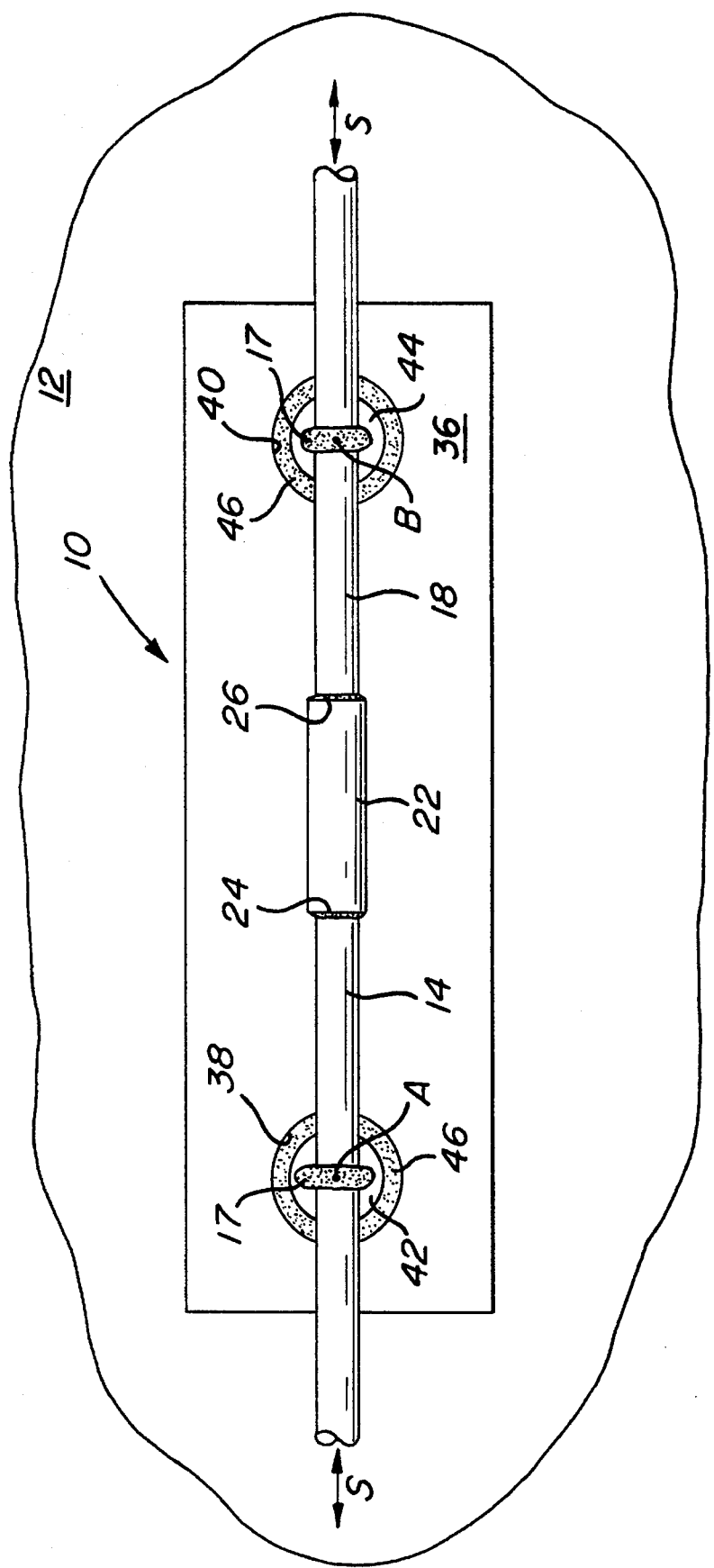
FIG. 5 is a pictorial view of an alternate embodiment of the optical fiber strain sensor of the present invention.

FIG. 5 shows another embodiment of the invention which includes a substrate 36, upon which fibers 14 and 18 and tube 22 are mounted, which makes sensor 10 more easily handled as a unit separate from structure 12. Substrate 36 has two holes 38 and 40 therethrough, which are positioned to align with points A and B, respectively, on structure 12 when the substrate is attached thereto. Two floating pads 42 and 44 are positioned in holes 38 and 40, respectively, and are sized to be smaller than the holes. Pads 42 and 44 are movably connected to subtrate 36 by an elastic adhesive 46 such as silicone rubber between their outer perimeters and the inner edges of holes 38 and 40. Substrate 36 is fixed to structure 12 via pads 42 and 44, which are rigidly fixed, such as by epoxy or cement, to the structure at respective points A and B. Pads 42 and 44 therefore move with points A and B when structure 12 experiences strain. Fibers 14 and 18 and tube 22 are positioned on and fixed to substrate 36 in the same manner as they are fixed to structure 12 in the previously discussed embodiments, with fiber 14 being fixed to pad 42 with adhesive 17, and fiber 18 being fixed to pad 44 with adhesive 17. Holes 38 and 40 and pads 42 and 44 are sized such that there is sufficient space between the outer perimeters of the pads and the inner edges of the holes for the pads to move within substrate 36 when structure 12 is strained. Tube 22 may also be positioned on substrate 36 so that it is not aligned between holes 38 and 40, in which case fibers 14 and 18 are adjusted in length and position accordingly, as discussed with respect to the previous embodiment.

Some of the many advantages of the present invention should now be readily apparent. For instance, a simple, durable, inexpensive, light-weight, and highly accurate strain sensor has been provided. Furthermore, an optical fiber strain sensor has been provided which can monitor the maximum strain a structure has experienced in a given timeframe and maintain it for later measurement without the need for continuous recording of the strain in real time.

Those skilled in the art will appreciate without any further explanation that many modifications and variations are possible to the above-disclosed optical fiber strain sensor, within the concept of this invention. Consequently, it should be understood that all such modifications and variations fall within the scope of the following claims.

What is claimed is:

1. Apparatus for sensing and retaining for later measurement the maximum displacement in a given direction which has occurred between a first location and a second location, comprising:

a first optical waveguide capable of transmitting light therethrough and having a flat end, attachable on a portion of the outer surface thereof to the first location;

a second optical waveguide capable of transmitting light therethrough and having a flat end, attachable on a portion of the outer surface thereof to the second location and positioned so that the flat ends of said first and second waveguides are in contact with each other across their entire surfaces;

a tube for slidably enclosing the flat ends of said first and second optical waveguides therein; and means for providing a frictional force between said first and second optical waveguides and said tube, the frictional force being of a magnitude that allows said first and second optical waveguides to slide with respect to said tube when the displacement increases the distance between the first and second locations, but does not allow said waveguides to slide with respect to said tube when the displacement decreases the distance between said first and second locations.

2. Apparatus for sensing and retaining for later measurement the maximum strain in a given direction which has occurred in a structure, comprising:

a first optical waveguide capable of transmitting light therethrough and having a cleaved end, fixed on a portion of its outer surface to the structure at a first location;

a second optical waveguide capable of transmitting light therethrough and having a cleaved end, fixed on a portion of its outer surface to the structure at a second location a known distance and in a known direction from the first location, and positioned so that the cleaved ends of said first and second waveguides are in contact with each other across their entire surfaces;

a tube fixed to the structure and slidably containing said first and second optical waveguides therein; and means for providing a frictional force between said tube and said first and second optical waveguides, the frictional force being of a magnitude that allows said first and second optical waveguides to slide with respect to said tube when the displacement increases the distance between the first and second locations, but does not allow said waveguides to slide with respect to said tube when the displacement decreases the distance between said first and second locations.

3. Apparatus for sensing and retaining for later measurement the maximum strain experienced by a structure in a given direction between first and second locations thereon a known distance apart, comprising:

a rigid substrate having first and second movable pads therein, which first and second pads are attachable to the structure at the first and second locations thereon, respectively;

a first optical waveguide capable of transmitting light therethrough and having a flat end, attached on a portion of the outer surface thereof to the first pad;

a second optical waveguide capable of transmitting light therethrough and having a flat end, attached on a portion of the outer surface thereof to the second pad and positioned so that the flat ends of said first and second waveguides are in contact with each other across their entire surfaces when said first and second optical waveguides are taut;

a tube fixed to the substrate and slidably enclosing the flat ends of said first and second optical waveguides therein; and means for providing friction between said first and second optical waveguides and said tube;

whereby strain experienced by the structure moves the movable pads, pulling said first and second optical waveguides, which waveguides slide with respect to said tube, thereby pulling the flat ends of said first and second waveguides a distance apart, and said means for providing friction retains the distance and prevents the flat ends from moving back towards each other.

4. The apparatus of claim 3, wherein said means for providing friction is a non-elastic adhesive positioned between said first and second optical waveguides and said tube.

5. The apparatus of claim 3, further comprising means for measuring the distance between the flat ends of said first and second optical waveguides as an indication of the maximum strain experienced by the structure.

6. The apparatus of claim 5, wherein said means for measuring the distance between the flat ends of said first and second optical waveguides comprises a means for launching light of a known intensity into said first optical waveguide and a means for measuring the intensity of the light emerging from said second optical waveguide.

* * * * *